2,972,490

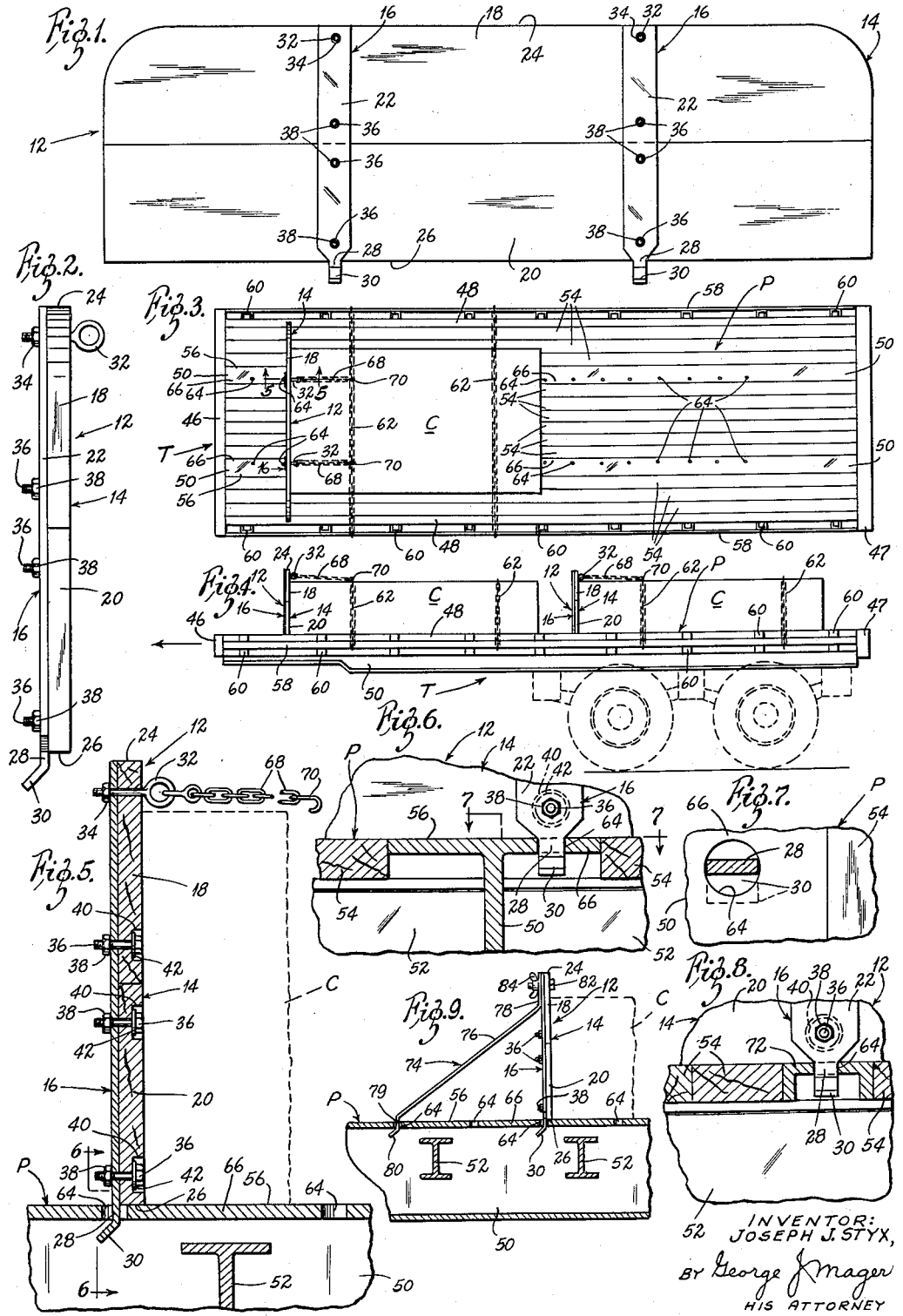

SAFETY BULKHEAD

Joseph J. Styx, Belleville, Ill.
(2322 S. 17th Ave., North Riverside, Ill.)

Filed Sept. 14, 1959, Ser. No. 839,769

1 Claim. (Cl. 280—179)

Generally, the present invention is directed to the provision of novel means in association with conventionally provided means for safely transporting cargo via vehicles from one site to another.

More particularly stated, the present invention is directed to the provision of means designed to safeguard the operators of cargo transport vehicles against personal injury in consequence of sudden brake applications that would be requisite under emergency conditions that may arise in the transit of freight via automotive vehicles.

The transportation of freight via highways rather than via railroads has become a major inductry. Trucks, combination trailer-trucks, platform trailers, closed top vans and so on, are in common usage throughout the land.

Inasmuch however as generally speaking, cargo of the type under consideration is extremely heavy, sudden brake applications have heretofore frequently resulted in serious injury to truck and tractor operators in consequence of the cargo shifting rapidly forwardly when the brakes were applied.

These hazards being known, much time and labor has heretofore been expended in attempts to construct barriers ahead of the load. However, no specific means or process to eliminate these hazards has to my knowledge ever been evolved, each vehicle operator using his best judgment in positioning the available binder chains over and about the cargo, and thereupon employing pieces of lumber, nails, and other material in an attempt to build up so to speak, a retaining wall about the cargo. Such procedure is customarily followed each time new cargo is loaded, and is a time-consuming, unsatisfactory, and obviously expensive operation.

The primary object of the present invention is to provide means for overcoming this problem, and for preventing accidents of the kind heretofore known to have resulted because such improvised cargo retaining means had given way when the vehicle was brought to a sudden stop.

To this end, the invention contemplates the provision of a novel bulkhead assembly that may be repeatedly employed to prevent the shifting of cargo loaded on vehicles of the type under consideration. Broadly, the bulkhead assembly comprises a sturdy rectangular panel, preferably of wood, and means associated therewith for releasably anchoring said panel in a selected vertical position on the load-bed of a vehicle immediately in front of the cargo. As will appear, the invention utilizes some of the existing equipment in carrying out its objectives, and particularly with respect to most conventional platform trailers, requires no manufacture change in their construction.

In addition to the panel aforesaid, the bulkhead assembly includes: a pair of transversely spaced anchor brackets that are rigidly secured to said panel, and are provided with depending extensions terminating in angularly disposed extremities; a pair of eyebolts; and a pair of anchor chains each having one end rigidly secured to one of said eyebolts and carrying a hook on its opposite end. When the bulkhead assembly is properly in place, the panel will be anchored at the bottom and at the top with the forward portion of the cargo contiguous to the rear face of the panel.

In other words, the angularly disposed lower end extremities of the anchor brackets would project below transversely aligned holes provided therefor in the main beams of the vehicle, the hooks on the free end of each anchor chain would be in engagement with one of the links included in a conventional binder chain, and the said binder chain would be tautly disposed over the cargo and have its ends rigidly secured to the rub rails, all as will be more fully explained hereinafter.

The invention is illustrated on a sheet of drawings that accompanies this specification. Objects, features and advantages of the invention that have not been specifically noted hereinbefore, will be apparent or pointed out in the course of the detailed description to follow with reference to said drawings, wherein:

Figure 1 is a front elevational view of a bulkhead embodying the concepts of the present invention;

Figure 2 is a right end elevational view, on an enlarged scale, of the bulkhead illustrated in Figure 1;

Figure 3 is a generally diagrammatical top plan view of an exemplary platform trailer having what will be termed a single load of cargo supported and anchored thereon in accordance with the teachings of this invention;

Figure 4 is a side elevational view of Figure 3, the tandem suspension of the platform trailer being indicated in broken lines, and two loads of cargo being shown supported and anchored thereon in accordance with the teachings of this invention;

Figure 5 is a vertical sectional view on an enlarged scale, of the bulkhead assembly, the view being taken longitudinally of one of the main frame members of the platform substantially along the line 5—5 of Figure 3;

Figure 6 is a fragmentary view partly in section and on an enlarged scale taken as indicated along the irregular line 6—6 in Figure 5;

Figure 7 is a fragmentary top plan view partly in section, taken as indicated along the line 7—7 of Figure 6;

Figure 8 is a view similar to Figure 6 illustrating an exemplary adaptation of the invention with respect to conventional all-wooden trailer and van platforms; and Figure 9 is a view on a reduced scale, similar to Figure 5, the bulkhead assembly however being shown in end elevation and maintained in position by bracket means instead of anchor chains.

Wherever it appears in the drawings either in whole or in part, the safety bulkhead assembly embodying the concepts of the present invention is generally designated by the numeral 12. It includes three major components, these being a generally rectangular panel 14, and a pair of identical anchor brackets 16.

As viewed in the drawings and suggested by the arrow appearing in Figure 4, it will be assumed that forward movement of the platform trailer would be in a leftward direction. Wherefore it will be understood that such terms as "front," "rear," "forward," "rearward" and the like employed herein, have been adopted in the interest of descriptive clarity with respect to the drawings.

As hereinbefore observed, the panel 14 may be constructed of wooden or metallic material. The wooden construction is preferable, inasmuch as it is less expensive from a manufacturing standpoint and furthermore, is lighter in weight. Wherefore, a wooden panel bulkhead assembly 12 has been selected for illustration in the drawings.

The illustrated panel 14 consists of abutting upper and lower half sections 18 and 20 respectively, that are coextensive in length, and preferably made of oak. It will of course be understood that the length as well as the height of the panel 14 may be varied in accordance with the width of the vehicle platform for which it is designed, and in accordance with the bulkiness of the cargo to be transported.

Each of the anchor brackets 16 includes a main body portion 22 that lies contiguous to the front face thereof, and extends from the top marginal edge 24 of the panel 14 to a point adjacent the bottom marginal edge 26 thereof, at which point said main body is reduced in width to provide a depending extension 28 that merges into an angular forwardly projecting extremity 30, as clearly shown particularly in Figures 1 and 5.

Numeral 32 designates an eyebolt extending through aligned openings provided therefor in said main body of each bracket 16 and in the upper end portion of the panel section 18. The eye of the bolt 32 projects rearwardly of the panel, and the opposite end thereof is threaded for engagement by a nut 34 as clearly shown in Figure 5.

As also best seen in said Figure 5, the main body 22 of each anchor bracket 16 is further rigidly secured to the panel 14 by a plurality of bolts 36 and thereto applied nuts 38. Preferably as shown, the heads of the bolts 36 are disposed in circular recesses 40 provided therefor in the rear face of the panel 14, said panel thus presenting a smooth surface to the cargo to be disposed thereagainst as will appear. Also, preferably but not necessarily, washers 42 as shown are interposed about the shanks of the bolts 36 and the heads of said bolts in the recesses 40.

It is believed apropos at this point, to describe the major components of the illustrated exemplary bulkhead 12 dimensionwise. Generally, trailer platforms, trucks, closed-top vans and like vehicles are restricted by law to an overall width not exceeding eight feet. Consequently for a standard vehicle bed, the end to end dimension of the panel 14 would be approximately seven feet and two inches. Each of the panel sections 18 and 20 comprises approximately one inch by twelve inch oaken planks, it being of course understood that other types of wood may be substituted. The transverse spacing of the anchor brackets 16 is dependent on factors to be explained below. Each of said brackets is fashioned of steel material, and the main body portion 22 thereof is approximately three and one half by one quarter inches in cross-sectional configuration. The depending extension 28 and the thereinto merging forwardly projecting extremity 30 measures one inch by one quarter inch in cross-sectional configuration.

In contemplation of the immediately preceding paragraph, attention is directed particularly to Figures 3 and 4, where top plan and side elevational views respectively of a well-known platform trailer T are presented more or less diagrammatically. In this type of trailer, the platform P is comprised of a structural steel frame that supports wooden flooring, the exposed upper surfaces of the frame members and of the flooring being disposed in the same plane.

Thus with reference also to Figures 5 through 7, the platform framework shown includes front and rear end rails 46 and 47 respectively, side rails 48, a pair of transversely spaced main frame members 50, and crossmembers 52, all interwelded to form what is generally termed a bridge-type platform framework. The main members 50 and the crossmembers 52 of this type of framework consist of I-beams, the top flanges of said crossmembers 52 being disposed below the similar flanges of said main members 50 as shown. The flooring of the platform is supported on the crossmembers, and is comprised of contiguously disposed wooden planks 54 that extend from end to end of the platform and span the space between the main frame members 50, and the spaces between each of said main frame members and one of the side rails 48.

Inasmuch as has been previously observed, the top surface of the flooring lies flush with the top surfaces of the upper flanges 56 of the spaced main frame members 50, it should be apparent that the cargo receiving platform is level throughout, and that a heavy load or loads deposited thereonto would have and do have a tendency to slide forwardly in consequence of emergency brake applications.

Shown extending from the front to the rear end rails of the platform and appropriately rigidly secured thereto are a pair of rub rails 58. Each of the rub rails 58 is horizontally spaced from one of the side rails 48, and at regular intervals, stake pockets 60 are provided, these being welded or otherwise rigidly interconnected with the contiguous side and rub rails in conventional fashion. A plurality of binder chains 62 are also standard equipment on trailers of the type under consideration, and these binder chains terminate at each end in hooks or the like that may engage the rub rails at any selected point, as is well understood.

The present invention contemplates no change whatever in the construction of platform trailers of this type. Rather, the present invention is concerned with providing means for rendering the transportation of heavy loads on such trailers less hazardous by providing bulkheads constructed as illustrated in the drawings, and herein described.

According to the concepts of the present invention, pairs of transversely aligned holes 64 would be drilled in the inner segments 66 of the top flanges 56 of the main I beams 50. The transverse spacing of the holes would obviously determine the transverse spacing of the brackets 16 of the bulkheads, inasmuch as the extensions 28 and the extremities 30 of said brackets are designed to extend into the holes as will appear. Thus, remembering the exemplary dimensions given with respect to the illustrated bulkhead 12, and assuming that similar bulkheads were contemplated for use on the platform trailer appearing in Figures 3 and 4, the drilled holes 64 would have a diameter very slightly in excess of one inch.

Although it will be understood that no precise spacing of the pairs of holes 64 longitudinalwise of the platform is requisite, spacing of them approximately twelve inches apart has been found entirely satisfactory. It will therefore be manifest especially from an inspection of Figure 3, that the only operation necessary to adapt conventional platforms for use of the present invention would consist in the drilling of two longitudinal rows of holes 64, the holes in one row being in transverse alignment with the holes in the other row.

In addition to the three major components described, a pair of anchor chains 68 is included in each bulkhead assembly 12. Preferably, each chain 68 is secured at one end to an eyebolt 32, and has a hook 70 on its free end.

The exemplary cargo schematically shown is designated C. It will be appreciated that the cargo or load may vary as to size, weight, and material. It will thus be assumed that the illustrated cargo C in each instance is comprised of superimposed rectangular sheets of steel, weighing in the aggregate approximately fifteen thousand pounds.

Although it is believed that from the foregoing description and the drawings it should be manifest how the invention attains its objectives, a brief further explanation will be given.

The size of the cargo would of course be known prior to its loading, and would determine the selection of an appropriate transverse pair of holes 64 for the reception of the bulkhead anchor bracket extremities 30. Thereupon the cargo would be loaded, with the forward portion thereof disposed slightly rearwardly of an imaginary line connecting the selected pair of holes, as should be understood.

After the cargo had been properly loaded, the bulkhead 12 would be positioned by inserting the extremities 30 into the selected holes 64, and thereafter swinging the bulkhead rearwardly to a vertical position against the forward portion of the cargo. The binder chains 62 would then be positioned over the cargo as heretofore with this one exception, that the chain 62 immediately rearward of the bulkhead would be positioned therefrom a distance slightly greater than the lengths of the chains 68. Consequently when the hooks 70 of the chains 68 would thereupon be forced into interlocking engagement with the appropriate links of said binder chain, a safety network would so to speak be built up about the forward portion of the cargo that will generally prevent it from shifting its position, and will positively prevent it from sliding forwardly off the platform.

It will be appreciated that some transport trailers in current use have all-wooden platforms. In order to adapt the present invention to such platforms, two of the floor planks 54 would be removed, and structural steel members substituted therefor. These steel members could be tubular and of rectangular configuration in cross-section, or as illustrated and designated 72 in Figure 8, they could be of channel configuration. It will be understood of course, that the removed planks 54 had been, and the substituted structural members 72 will be, spaced approximately similarly to the I-beams 50 of the Figure 3 platform.

It will further be appreciated that the invention is also adapted for use in closed top vans, railway freight cars and so on. Inasmuch as such vehicles of transportation are not equipped with rub rails and consequently afford no means for anchoring the ends of binder chains, the present invention substitutes a pair of braces for each bulkhead instead of the chains 68.

Thus as shown in Figure 9, for platforms not equipped with rub rails, the invention contemplates a pair of angular braces 74, each brace comprising a main body portion 76 that terminates at the top in an upstanding flange 78, and at the bottom in a depending extension 79 that merges into an angular forwardly projecting extremity 80. The main body portion 76 and the flange 78 preferably have a width corresponding to that of the adjacent anchor bracket 16, and the width of the depending extension 79 and its extremity 80 corresponds to that of the extension 28 of said bracket and its extremity 30. Bolts 82 replace the eyebolts 32 of the main form of bulkhead assembly. Each bolt 82 extends through aligned openings provided therefor in the upper end portion of the panel section 18, the anchor bracket 16, and the flange 78. Numeral 84 indicates a thumbnut applied to the projecting threaded end of the bolt 82, whereby the braces 74 are rigidly secured to the bulkhead.

In view of the foregoing description and the drawings, it should be manifest that the invention is readily adaptable to load-beds of many types. Thus for example, the Figure 9 arrangement could be employed on the Figures 3 and 4 type, as well as on the Figure 8 type of platform. Wherefore the invention is not to be restricted to the precise details of construction and use illustrated and described, but contemplates any modifications that may fall within the scope of the claim hereunto appended.

What I claim is:

In combination with the load-bed of a platform trailer or like vehicle, said load-bed including a pair of transversely spaced longitudinally extending main frame members having top flanges that lie flush with the upper surface of the load-bed and are provided with pairs of spaced transversely aligned circular holes, and a rub rail rigidly secured to the load-bed in horizontally spaced relation thereto extending along each side thereof, said rub rails being adapted to have the opposite ends of binder chains anchored thereto: a bulkhead assembly for preventing forward shiftings of cargo carried on said load-bed in consequence of sudden and abrupt stoppings of the vehicle, said assembly comprising: a sturdy rectangular panel member substantially coextensive with the width of the load-bed and provided with a flat bottom face; a pair of transversely spaced bracket members each including a main body portion rigidly secured to the panel and extending contiguous to the front face of the panel from the top marginal edge to a point adjacent the bottom marginal edge thereof; a reduced extension depending from the main body portion of each bracket and terminating in an angularly forwardly projecting extremity, the width of said extension and extremity corresponding approximately with the diameters of the holes in the main frame flanges aforesaid; a pair of eyebolts each rigidly secured to the panel and one of said brackets near the upper end portions thereof, the eyes of said bolts projecting from the rear face of said panel; and a pair of anchor chains each secured at one end to one of said eyes and provided with a hook on its opposite free end; said panel member being adapted to be vertically disposed against the forward portion of the cargo with the bottom face of said member resting on the upper surface of said load-bed, and with the extensions and angularly forwardly projecting extremities of said pair of brackets extending through a pair of the transversely aligned holes of the main frame members; and said hooks on the free ends of the anchor chains each being adapted to engage an appropriate link of a binder chain tautly disposed over said cargo a determined distance rearwardly of the panel.

References Cited in the file of this patent

UNITED STATES PATENTS

| | | |
|---|---|---|
| 518,207 | Cassaday et al. | Apr. 10, 1894 |
| 1,375,183 | Saunders | Apr. 19, 1921 |
| 1,499,229 | Jaffey | June 24, 1924 |
| 2,301,866 | Goodall | Nov. 10, 1942 |